No. 676,775. Patented June 18, 1901.
T. J. SCHMIDT.
AUTOMATIC AND ADJUSTABLE CAR STEP.
(Application filed Dec. 24, 1900.)
(No Model.) 2 Sheets—Sheet 2.
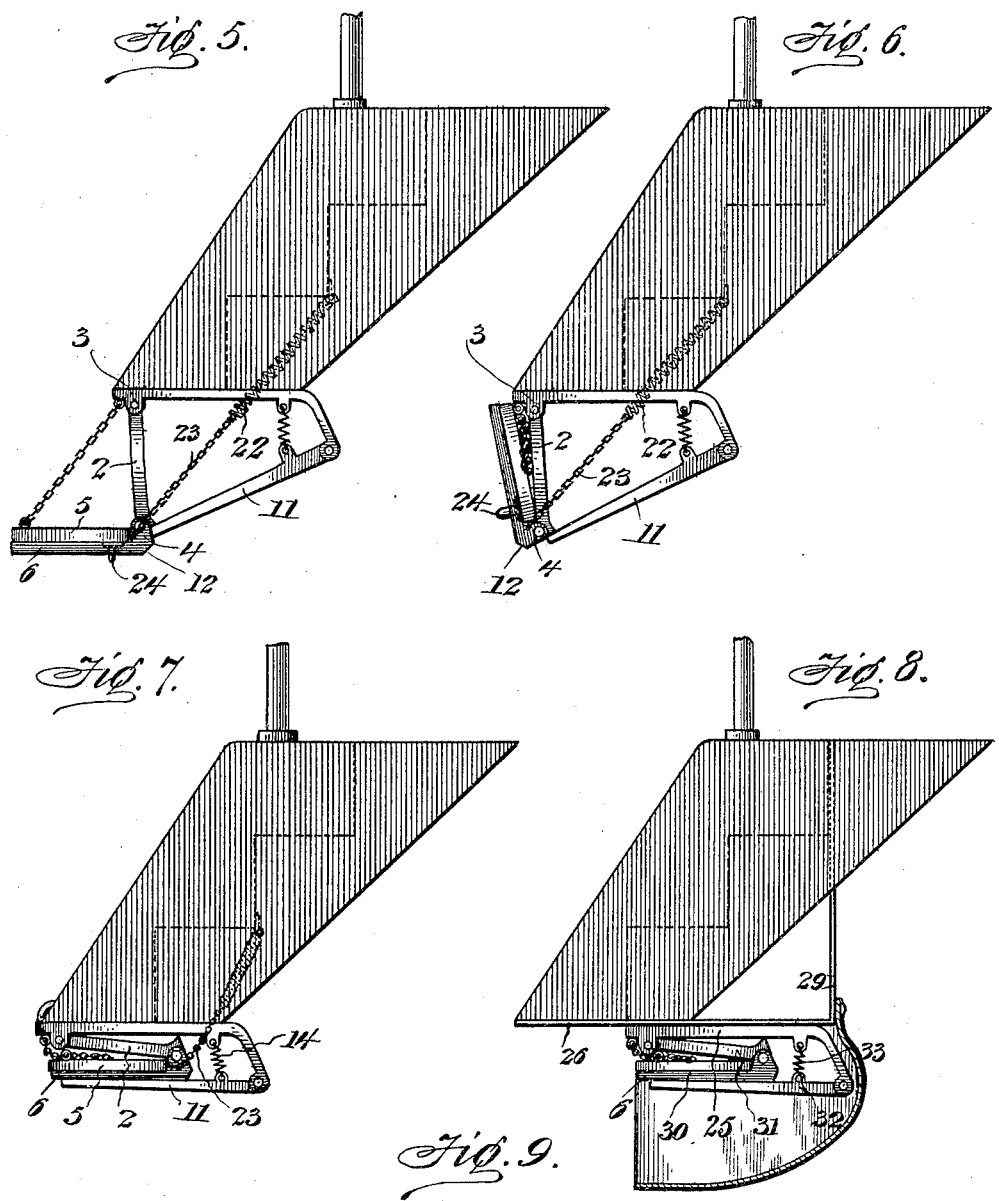

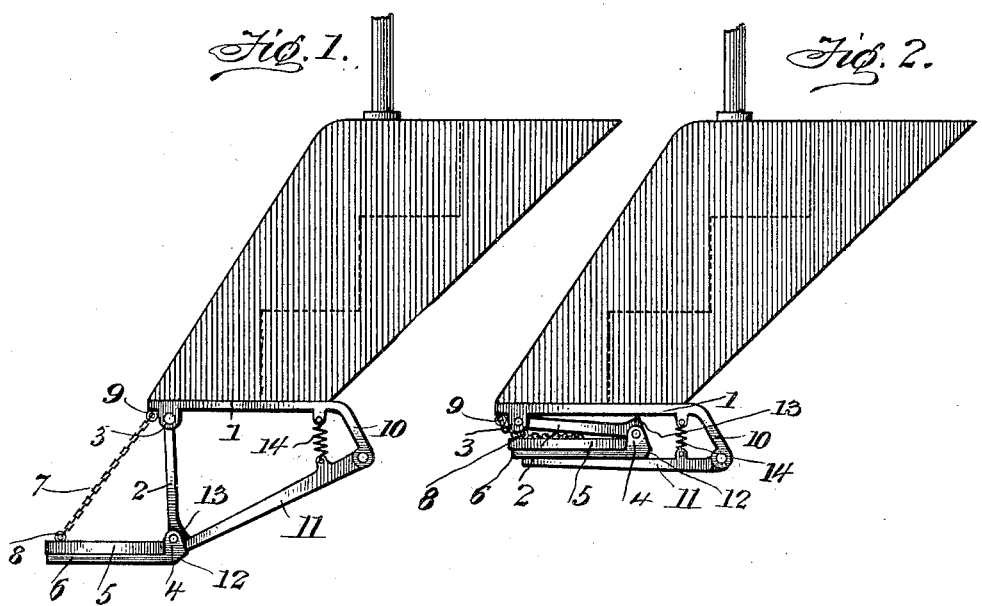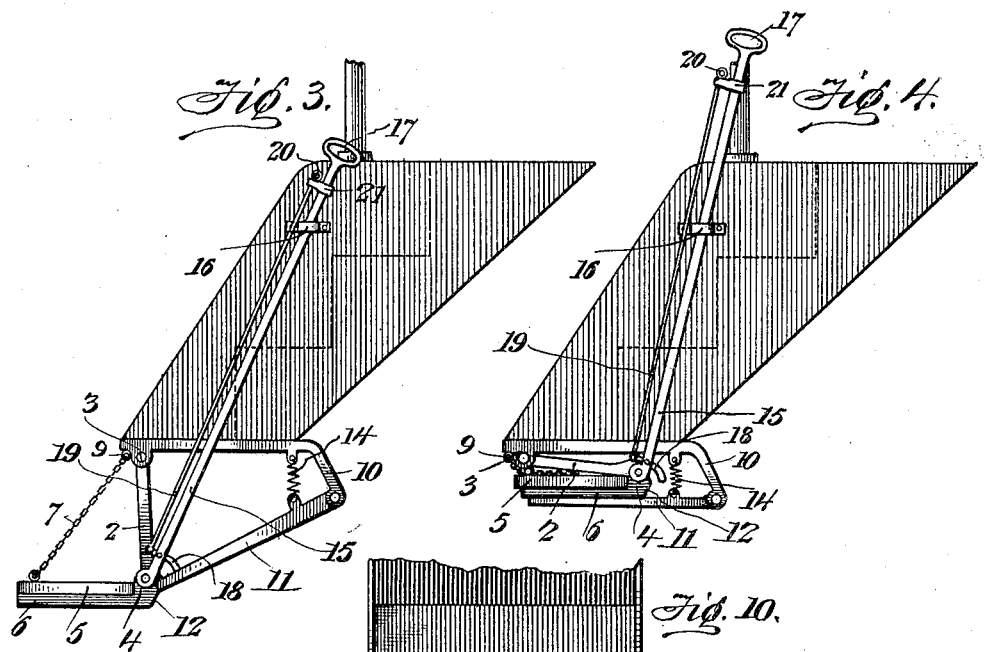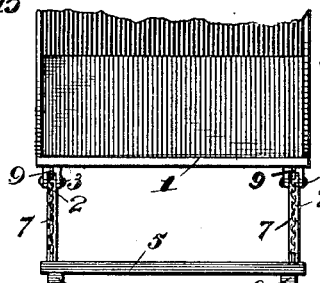

UNITED STATES PATENT OFFICE.

THEODORE J. SCHMIDT, OF TOLEDO, OHIO.

AUTOMATIC AND ADJUSTABLE CAR-STEP.

SPECIFICATION forming part of Letters Patent No. 676,775, dated June 18, 1901.

Application filed December 24, 1900. Serial No. 40,938. (No model.)

*To all whom it may concern:*

Be it known that I, THEODORE J. SCHMIDT, a citizen of the United States, residing at Toledo, in the county of Lucas and State of Ohio, have invented certain new and useful Improvements in Automatic and Adjustable Car-Steps; and I do hereby declare the following to be a full, clear, and exact description of the invention, such as will enable others skilled in the art to which it appertains to make and use the same.

My invention relates to improvements in folding steps for cars or other vehicles, and is particularly adaptable to railway-cars, street-cars, or other vehicles in which the steps are high from the ground.

It consists in a step adapted to be suspended below the ordinary steps of a car or other vehicle, hinged means for supporting the same, and means for automatically folding the step up beneath the other steps of the vehicle when the same is not in use.

It also consists in a folding step suspended below the ordinary steps of a vehicle and spring-actuated locking means for holding the step in its unfolded position, the said means also operating to hold the step in its folded position when the same is in its closed position.

It further consists in a step hinged to a vehicle, a spring secured thereto for assisting in folding the step, means for locking the step in its unfolded position, the said means also operating to hold the step in its folded position, and means for limiting the downward movement of the step.

It also consists in certain other novel constructions, combinations, and arrangements of parts, as will be hereinafter fully described and claimed.

In the accompanying drawings, Figure 1 is an end elevation of a step secured to the ordinary steps of a car or other vehicle, the step being in its lowered or unfolded position. Fig. 2 is a view showing the step folded up out of the way when the vehicle is traveling. Fig. 3 is an end elevation of such a step, but showing means for releasing the step-locking mechanism for permitting the step to be folded. Fig. 4 is a similar view, showing the step in its folded position. Figs. 5 and 6 are end elevations of steps, illustrating the spring mechanism for assisting in folding the said step. Fig. 7 is a similar view showing the same mechanism in the position which it occupies when the step is folded. Fig. 8 represents an end elevation of a step in its folded position, said step and its supporting mechanism being mounted on tracks or guideways by which it may be moved inwardly from the edge of the support from which it is suspended. Fig. 9 is a detail cross-sectional view through one of the said tracks or guideways. Fig. 10 is a front elevation of one of my improved steps when the same is in its lowered or unfolded position.

In many vehicles in common use the steps forming the entrance-way thereto or the exit-passage therefrom are generally too high from the ground or other surface upon which the vehicle runs to make it easy and convenient for passengers to enter or leave the said vehicle. In the case of railway-cars the steps are usually purposely made high because of the great speed with which such vehicles travel and the danger of having the steps too close to the ground or track. In using such cars it is common to have to resort to portable steps or boxes for assisting passengers to reach the steps or to construct platforms in suitable proximity to the car-steps for accomplishing the same purpose. In many street-cars in common use, especially those employing mechanical motors, the steps are made some distance from the ground, not only because of the rapid movement of the cars, but because the floors or platforms of the cars are quite high to accommodate the motors employed in driving the vehicle.

In the above and many other vehicles it is desirable to provide means for reaching the steps of the same which can be placed out of the way when the vehicle is traveling and yet can be easily drawn into position for assisting in the entrance or exit of passengers from such vehicles. My invention provides a simple and effective automatically-operating folding step which when in use will be in the position which would be occupied by a lower step upon the vehicle if such were constructed. When the step is unoccupied, it can be folded up out of the way, occupying very little space and not extending sufficiently below the ordinary steps or platforms in use to cause any danger to the parts of the vehicle or to parties traveling in the same.

For the sake of illustrating the device I have shown a step embodying in its construction the features of the present invention secured to the lower step of a railway-vehicle. As seen in Figs. 1 and 2 of the drawings, a supporting-bracket, as 1, is secured to the under side of the bottom step of a car. Near the forward edge of said lower step I preferably secure to the brackets 1, one of which is placed at each end of the steps, links 2 2, which depend therefrom, being pivoted to lugs 3 3, formed upon the brackets 1. The lower ends of the links 2 are pivoted to lugs 4, secured at the rear edge of the folding step 5. The lugs 4 are formed upon cleats or supporting-bars 6, secured to the under surface of the step 5. In order to limit the downward movement of the step 5, I preferably employ chains, as 7 7, secured to eyes 8 at the forward edge of the step 5 and eyes 9 at the forward edge of the brackets 1. These chains limit the downward movement of the step 5, and yet, being flexible, permit the step to be folded without interfering with the operation. It would be apparent, of course, that I might employ links or levers pivotally connected together or a series of links pivoted together in the place of the chains 7; but I find the chains preferable, since they are so flexible.

In order to lock the step in its lowered position, I form the brackets 1 with depending portions 10 at their rear ends, to the lower ends of which depending portions I pivotally secure locking-levers 11. The levers 11 extend forward and are adapted to engage shoulders or abutments 12, formed on the rear ends of the cleats 6. The lower ends of the links 2 are also formed with shouldered portions or abutments, as 13, adapted to engage the ends of the levers 11. The levers 11 are normally drawn upwardly by means of springs 14 14, interposed between the said levers and the brackets 1. When the step is in its unfolded position, the shoulders or abutments 13 prevent the levers 11 from being drawn upwardly, while the shoulders 12, engaging the ends of the said levers 11, hold the step 5 rigidly in its lowered position. When it is desired to fold the step, the forward edge of the said step is raised either by hand or by foot, so that the shoulders 12 of the cleats 6 will slip by the ends of the levers 11 and will become disengaged therefrom and slide along the upper surface of the said levers. After the links 2 have passed a plane which is perpendicular to the plane of the levers 11 the action of the springs 14 will assist in automatically folding the step beneath the car-staircase, as clearly illustrated in Fig. 2 of the drawings. The springs 14 will also constitute a sufficient means for holding a step in its folded position as long as desired. When it is wished to use the step, it is merely necessary to pull the step downwardly and forwardly either by hand or by foot until the ends of the levers 11 again engage the shoulders 12 of the step. The said shoulders are so constructed that the ends of the levers 11 will be sufficiently close to the pivotal connection between the links 2 and the lugs 4 to prevent the step from folding accidentally. When a weight is placed upon the step 5, it only serves to more securely shoulder the same against the ends of the locking-levers 11.

I also contemplate employing means for folding or unfolding the step from the car-platform or its steps, and for this purpose I provide an operating-lever, as 15, which is pivotally secured to one of the lugs 4 of the step 5. The lever 15 may pass through a suitable guide-clip, as at 16, and be provided with a handhold 17 at its upper end. A lever 15 is also provided with a disengaging lever or trip, as 18, pivoted to the lever 15 near its lower end and adapted to rest upon the upper edge of the lever 11. An operating-rod, as 19, is pivotally secured to the outer end of the trip 18 and extends along parallel with the lever 15 to a point near the handle 17. The rod 19 may also be provided with a handle, as 20, within easy reach of the hand of an operator when the same is upon the handle 17. The rod 19 may be guided in its longitudinal movement by a clip, as 21, secured to the lever or bar 15. By grasping the handle 17 and placing the finger through the handle 20 of the rod 19 the trip 18 may be operated to force the locking-levers 11 downwardly and out of engagement with the shoulders 12, when the step 5 may be drawn upwardly into its folded position by means of the said operating-lever 15. The parts will assume the position, when the step is folded, seen in Fig. 4 of the drawings. When the step is to be lowered for use, it is merely necessary to force the operating lever or bar 15 downwardly until the lever 11 engages the shoulder 12.

In addition to the springs 14 for assisting in folding the step I may also use other means for automatically drawing the step upwardly. Such a means I have shown in Figs. 5, 6, and 7 of the drawings, where a spring 22 will be seen secured at its upper end to the steps of the car, while its lower end is connected, by means of a chain 23, with the rear edge of the folding step. The connection of the chain 23 with the step 5 is such that the spring 22 will draw upon a line below the center of the pivotal connections of the said step with the links 2 when the step is in its lowered position, thus serving to hold the step the more firmly in engagement with the locking-levers 11. When the forward edge of the step is lifted, however, the line of draft of the said spring 22 and the chain 23 will be brought above the pivotal connection of the step with the said links 2, as seen in Fig. 6 of the drawings, when the said spring will operate to automatically draw the step up into its folded position. The shoulders 12 will of course become disengaged from the locking-levers 11 as soon as the front edge of the step is lifted, as can be seen in said Fig. 6. In this construction all that is required is to lift the front end of the step with the hand or kick it up with the foot, when the step will be automatically drawn into its folded position and out of the way ready for travel. The action of the springs 14 and the levers 11 for holding the step in its folded position will be the same as heretofore described and as will be further apparent by reference to Fig. 7 of the drawings.

If desired, the step 5 may be provided with a handle, as 24, secured to its under surface, by which the step can be readily drawn downwardly and outwardly into its unfolded position.

In some instances it may be desirable to render it possible for the step when folded to be moved inwardly from the outer edge of the vehicle steps or platform, and for accomplishing this purpose I may mount the supporting-brackets of the step, as 25, upon guide rails or tracks, as 26. The upper edges of the supports 25 are preferably formed with T-heads, as 27, adapted to engage correspondingly-shaped grooves 28, formed in the rails or tracks 26. The tracks 26 extend from the forward edge of the car-step inwardly quite a distance and are preferably braced at their inner ends by bracing bars or brackets 29. By means of these tracks the step when folded can be pushed inwardly to the extent of the width of a step or to a greater or less degree, as found desirable. In this instance the construction of step, as 30, and its supporting-links, as 31, together with the locking-levers 32 and closing-springs 33, will be practically the same as that above described in connection with the other figures of the drawings.

It will be evident that I may use a support for the step at each end of the said step or at intermediate points without departing from the spirit of the invention and that such a folding step can be applied directly to the platform of a car or other vehicle or to the lower step if the said vehicle is provided with steps.

The device will be found to be an extremely useful one, especially for vehicles in which the steps or platforms are extremely high, and the device may also be one which can be easily and quickly manipulated and can be formed so as not to get out of order easily.

It is desirable to protect the step from ice and mud, especially when used upon railway-cars or other rapidly-traveling vehicles, and for this purpose I arrange a casing, as 33, made of light metal or other suitable material and adapted to extend around the step and its mechanism when the same is in its folded position. This casing may be made in any suitable form without departing from the spirit of the invention.

Of course I do not wish to be understood as limiting myself to the use of my improved step upon vehicles alone, since some can be employed upon platforms and other elevated places where it is desired to employ a step which can be brought into use when necessary, but may be folded out of the way when not in use, all within the spirit of the present invention.

Having now described my invention, what I claim as new, and desire to secure by Letters Patent, is—

1. A folding step for vehicles, comprising a step proper, supporting-bars for the same secured to said vehicle, a link secured to one end of each bar for pivotally supporting the step, means interposed between the other end of each of said bars and the step for holding the same in its lowered position, and means for limiting the extent to which the step may be unfolded, substantially as described.

2. A folding step for vehicles, comprising a step proper, pivoted links for supporting the same, and automatically-controlled spring-controlled means for locking the said step in its lowered position, the said step resting when folded on said means and being supported thereby, substantially as described.

3. A folding step, comprising a step proper, supports therefor, links connecting the supports and steps, locking-levers secured to the supports and adapted to engage shoulders upon the steps, and means for automatically holding the locking-levers in engagement with the said step, substantially as described.

4. A folding step, comprising a step proper, cleats secured thereto and provided with shoulders, links pivoted to the said cleats, supporting-bars from which the said links are supported, locking-levers pivoted to the said supporting-bars and adapted to engage the shoulders upon the said cleats, means for preventing the locking-levers from being moved upwardly too far, and means for exerting an upward pull upon the said levers, substantially as described.

5. A folding step having pivoted links secured to its rear edge, supporting-bars carrying the said links, chains connecting the bars with the outer edge of the step for limiting its downward movement, locking-levers pivoted to the supporting-bars, shoulders formed upon the steps for engaging the said locking-levers, shoulders upon the links also for engaging the said locking-levers to prevent their upward movement when the step is in its lowered position, and springs for drawing the locking-levers upwardly, the structure being such that when the step is lowered the locking-levers will engage the shoulders upon the steps and upon the links for rigidly holding the same in position, and when the step is lifted the shoulders will slip from the end of the locking-levers and the locking-levers will serve to draw the step upwardly into its folded position, substantially as described.

6. A folding step for platforms, vehicles or the like, comprising supporting-bars secured beneath the same, links pivoted to the forward ends of said bars, a step having cleats provided with lugs and pivotally attached to said links, shoulders formed upon the said cleats, shoulders upon the said links, depending portions formed at the rear ends of the supporting-bars, locking-levers pivoted to the said depending portions and adapted to engage the shoulders upon the cleats and the links, springs for normally drawing the locking-levers upwardly, and chains for limiting the downward movement of the step, substantially as described.

7. A folding step for platforms, vehicle-steps and the like, comprising a step proper, pivotal means for supporting the same, locking-levers for holding the steps in their lowered position, and means for throwing the locking-levers out of engagement with the said step, so that the step may be drawn upwardly into a folded position, substantially as described.

8. A folding step, comprising a step proper, pivoted links for supporting the same, locking-levers engaging the said steps, operating levers or bars pivotally connected with the step, and trip mechanism carried by the said levers or bars for disengaging the locking-levers from the step, whereby the step may be drawn upwardly by the said operating-lever and may be forced downwardly again upon the same, substantially as described.

9. A folding step for platforms, car-steps and the like, comprising a step proper, pivotal means for supporting the same, locking-levers for holding the step in its lowered and in its folded position, an operating-lever pivotally connected with the step comprising a bar having a handle at its upper end, means for guiding the bar in its longitudinal movement, a trip mechanism carried by the said bar, consisting of a trip-lever adapted to engage the locking-levers, and an operating-rod secured to the trip-lever and provided with a handle near the handle of the operating-bar, the structure being such that the trip mechanism may be operated to disengage the step from the locking-levers, and the operating-bar may be used to draw the step up or force the same down, substantially as described.

10. A folding step comprising a step proper, pivotal means for suspending the same from a platform, car-step or the like, locking-levers for engaging the same, and means for automatically raising the step comprising a spring, and a flexible connection joining the spring with the said step, the line of draft of the said spring being so arranged as to pull upon one side of the pivotal point of the step when in its lowered position, and upon the other side of the pivotal point of the step when it is to be raised whereby the spring will automatically fold the step, substantially as described.

11. A folding step comprising a step proper, sliding supports for holding the same, means for pivotally connecting the step with said supports, means for holding the step in its lowered or in its folded position, the said supports being adapted to be pushed inwardly or pulled outwardly upon suitable guideways whether the step is lowered or folded, substantially as described.

12. An adjustable folding step comprising a step proper, longitudinally-sliding supports for holding the same, whereby the step may be moved in and out on a longitudinal plane, T-heads formed upon the said supports, tracks or guideways provided with T-grooves for engaging the said T-heads, the structure being such that the step mechanism may be moved back and forth in the guide-grooves for adjusting it in different positions, substantially as described.

In testimony whereof I hereunto affix my signature in presence of two witnesses.

THEODORE J. SCHMIDT.

Witnesses:
A. J. CROLL,
EDWIN E. EDGE.